(12) United States Patent
Johansson et al.

(10) Patent No.: US 8,560,835 B2
(45) Date of Patent: Oct. 15, 2013

(54) METHOD AND APPARATUS FOR MACHINE-TO-MACHINE COMMUNICATION

(75) Inventors: Mattias Johansson, Solna (SE); Yi Cheng, Spanga (SE); Vincent Huang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 12/997,468

(22) PCT Filed: Jun. 12, 2008

(86) PCT No.: PCT/EP2008/057420
§ 371 (c)(1),
(2), (4) Date: Dec. 10, 2010

(87) PCT Pub. No.: WO2009/149759
PCT Pub. Date: Dec. 17, 2009

(65) Prior Publication Data
US 2011/0154022 A1    Jun. 23, 2011

(51) Int. Cl.
*H04L 9/08* (2006.01)
(52) U.S. Cl.
USPC .......................... 713/154; 713/153; 713/169
(58) Field of Classification Search
USPC ........................................................ 713/154
See application file for complete search history.

(56) References Cited

U.S. PATENT DOCUMENTS

| | | | |
|---|---|---|---|
| 7,181,620 B1 * | 2/2007 | Hur | 713/171 |
| 7,565,537 B2 * | 7/2009 | Morais et al. | 713/169 |
| 7,716,483 B2 * | 5/2010 | Sozzani et al. | 713/171 |

(Continued)

FOREIGN PATENT DOCUMENTS

| | | |
|---|---|---|
| EP | 1863223 A1 | 12/2007 |
| JP | 2006246081 A | 9/2006 |
| WO | 2009/031110 A2 | 3/2009 |

OTHER PUBLICATIONS

"Zigbee" ("Zigbee Specification" Chapter 3, "Securities Services Specification", 2005).*

(Continued)

*Primary Examiner* — Kambiz Zand
*Assistant Examiner* — Yonas Bayou
(74) *Attorney, Agent, or Firm* — Coats & Bennett, P.L.L.C.

(57) ABSTRACT

According to a first aspect of the present invention there is provided a method of at least partly delegating processing of data in a machine-to-machine system to reduce computational load on a broker entity 11 while maintaining security of the data to be processed, the broker entity 11 serving as a link between a node 13 of a sensor network providing the data and an application node 12 requesting the data. In the method, at the broker entity 11, following receipt of a request for processed data from the application node 12, determining the node to provide the data to be processed, generating a data key for the data-providing node 13, generating a data-processing algorithm for processing the data in dependence upon the request, sending the data key to the data-providing node 13, and sending the data key and data-processing algorithm to a remote data-processing entity 15. At the data-providing node 13, encrypting the data using the data key and sending the encrypted data to the data-processing entity 15. At the data-processing entity 15, decrypting the data using the data key, processing the data using the data-processing algorithm, and sending the processed data to the application node 12.

20 Claims, 5 Drawing Sheets

(56) References Cited

U.S. PATENT DOCUMENTS

| | | | |
|---|---|---|---|
| 7,900,038 B2* | 3/2011 | Suto et al. | 713/151 |
| 2001/0016909 A1* | 8/2001 | Gehrmann | 713/171 |
| 2002/0114453 A1* | 8/2002 | Bartholet et al. | 380/44 |
| 2005/0076233 A1* | 4/2005 | Aarts et al. | 713/201 |
| 2005/0208928 A1* | 9/2005 | Avery et al. | 455/412.2 |
| 2007/0147619 A1* | 6/2007 | Bellows et al. | 380/277 |
| 2007/0201087 A1* | 8/2007 | Saito | 358/1.15 |
| 2007/0283001 A1* | 12/2007 | Spiess et al. | 709/224 |
| 2010/0257218 A1* | 10/2010 | Vassilev et al. | 707/823 |
| 2011/0119489 A1* | 5/2011 | Garcia Morchon et al. | 713/169 |

OTHER PUBLICATIONS

Menezes, P. et al. Handbook of Applied Cryptography, "Chapter 13: Key Management Techniques." CRC Press, 1996.

Isomura, M. et al. "Sharing Sensor Networks." Proceedings of the 26th IEEE International Conference on Distributed Computing Systems Workshops (ICDCSW'06), Lisbon, Portugal, Jul. 4-7, 2006.

Arnaudov, V. "Unified Management of Heterogeneous Sensor Networks in the Atlantis Framework." Undergraduate Honors Theses, Brown University, 2005. Available online at: http://www.cs.brown.edu/research/pubs/theses/ugrad/2005/varnaudo.pdf.

* cited by examiner

METHOD AND APPARATUS FOR MACHINE-TO-MACHINE COMMUNICATION

TECHNICAL FIELD

The present invention relates to a method and apparatus for use in a Machine-to-Machine communication system.

BACKGROUND

The term M2M (Machine-to-Machine) generally refers to data communications between machines in the form of telemetry or telematics. M2M communication can take place over Ethernet, Public Switched Telephone networks (PSTN) or the Internet but in recent years an increasing proportion of M2M communication now takes place over public wireless data networks such as the General Packet Radio Service (GPRS).

Figure 1:
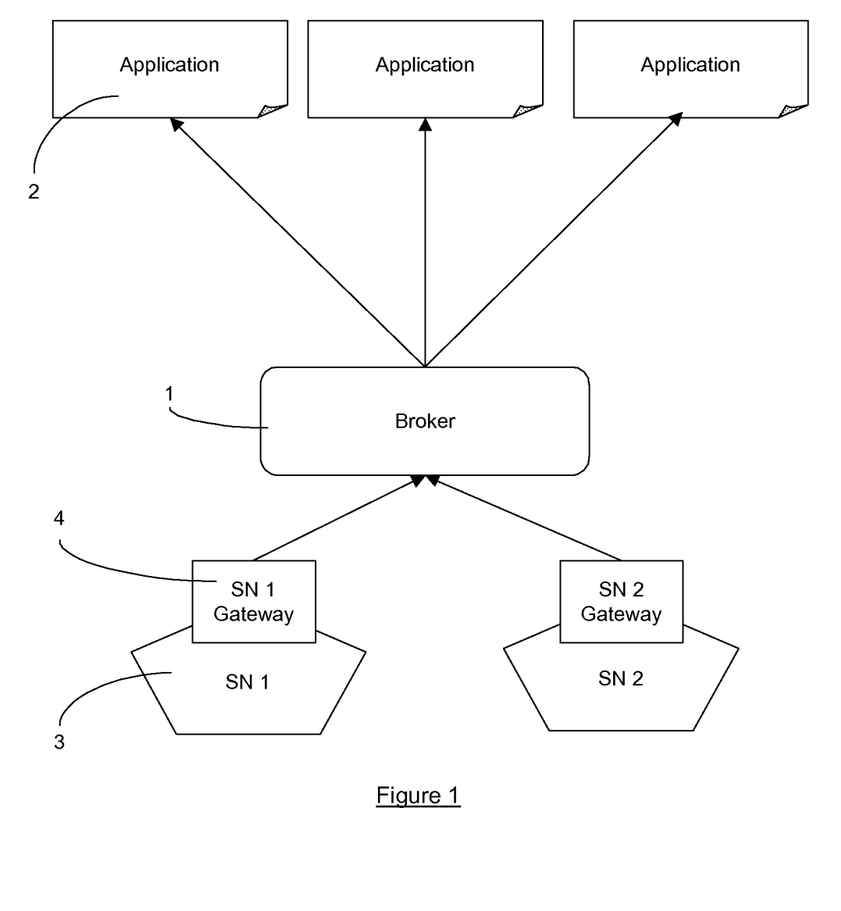
FIG. 1, discussed hereinbefore, illustrates schematically a known M2M System.

In the M2M world most communication is message based and is therefore suitable for going through a proxy. FIG. 1 of the accompanying drawings illustrates schematically a known M2M system comprised of a Broker 1, one or several Applications 2, and one or more Sensor Networks (SN) 3. Each SN 3 comprises at least one data collecting device (not shown) and communicates with the Broker 1 via an SN Gateway 4. The Broker 1 collects data from all SNs 3 and provides data services to the Applications 2, performing data processing and aggregation services so that the Applications 2 can be provided with processed data from any of a number of SNs 3. The Broker 1 also provides data access authorization and a data market place for individual sensor network providers. In such a system, the SN Gateway 4 of each individual SN 3 can be a very simple device, only authenticating and communicating with the Broker 1.

With the rapid deployment of SNs and increased usage of M2M communication, the data processing workload of a Broker can be significant, especially when streaming data is sent from a SN. It is desirable to address this issue.

The article "Unified Management of Heterogeneous Sensor Networks in the Atlantis Framework" by Vesselin Arnaudov (Department of Computer Science, Brown University, Undergraduate Honors Theses, online) discloses a method of processing of data in a machine-to-machine system including a broker entity serving as a link between a node of a sensor network providing the data and an application node requesting the data.

SUMMARY

According to a first aspect of the present invention there is provided a method of at least partly delegating processing of data in a machine-to-machine system to reduce computational load on a broker entity while maintaining security of the data to be processed, the broker entity serving as a link between a node of a sensor network providing the data and an application node requesting the data. In the method, at the broker entity, following receipt of a request for processed data from the application node, the node to provide the data to be processed is determined, a data key for the data-providing node is generated, a data-processing algorithm for processing the data in dependence upon the request is generated, the data key is sent to the data-providing node, and the data key and data-processing algorithm are sent to a remote data-processing entity. At the data-providing node, the data is encrypted using the data key and sent to the data-processing entity. At the data-processing entity, the data is decrypted using the data key, processed using the data-processing algorithm and the processed data is sent to the application node.

Embodiments of the present invention provide for distribution of data processing to increase scalability of M2M systems whilst maintaining the privacy of the information provided by sensor network.

Embodiments of the present invention provide that the data-processing entity is authenticated by sending a message from the broker entity to the data-processing entity, for example via the application node, requesting the data-processing entity's public key certificate. The data-processing entity sends a message to the broker, for example via the application node, containing the data-processing entity's public key certificate and the broker entity confirms if the certificate is valid.

In a particular implementation, the step of sending the data key and data-processing algorithm to the data-processing entity comprises, at the broker entity, encrypting the data key and data-processing algorithm using a public key of the data-processing entity, sending the encrypted data key and data-processing algorithm to the data-processing entity. At the data-processing entity, the data key and data-processing algorithm are decrypted using the data-processing entities private key.

It may be that the data-processing algorithm is arranged so as to filter out at least some information from the data it is used to process and that only the processed data is sent to the application node, thereby hiding the unprocessed data from the application node.

The data key and data-processing algorithm may be sent to the data-processing entity via the application node.

The sending of data from the data-providing node to the data-processing entity may bypass the broker entity. The data-providing node may comprise a plurality of nodes.

The method may further comprise sending a further data-processing algorithm to the data-processing entity, and using this data-processing algorithm at the data-processing entity to process already-received data. At the data-processing entity, the data processed using the further data-processing algorithm may be sent to a further application node associated with the further data-processing algorithm.

In a particular implementation, the step of sending the data to the data-processing entity comprises, establishing a communication network session between the data-providing node and the data-processing entity, and sending the data using the communication network session.

Establishing the communication network session may comprise, at the broker entity, generating an access token and a session key and sending these to the data-providing node, the data-providing node using the access token and the session key to authenticate and register with the communication network, and once the data-providing node is registered with the communication network, the data-providing node sending a session initiation message to the data-processing entity. The session key may be a cryptographic function of the broker's public key and a session identifier, and the access token may comprise at least the identity of the broker and the session identifier signed with a private key of the broker.

Authenticating and registering the data-providing node with the communication network may comprise, sending a register message containing the access token to the communication network, the communication network using the identity of the broker contained within the access token to determine the public key of the broker, using the session identifier contained within the access token and the public key of the broker to calculate the session key, and using the session key as a shared secret to mutually authenticate the communication network and the data-providing node.

The communication network may be an IP Multimedia Subsystem.

The data-processing entity may be provided in an application environment associated with the application node.

According to a second aspect of the present invention there is provided a broker entity. The broker entity comprising a receiver for receiving the request for processed data from the application node, a data reasoner for determining the node to provide the data to be processed and generating the data-processing algorithm to process the data in dependence upon the request, a key generator for generating the data key for the data-providing node, a transmitter for sending the data key to the data-providing node, and a transmitter for sending the data key and data-processing algorithm to the remote data-processing entity.

The broker entity may further comprise a transmitter for sending a message to the data-processing entity requesting the data-processing entity's public key certificate, a receiver for receiving a message containing the data-processing entity's public key certificate, and a processor for confirming if the certificate is valid and authenticating the data-processing entity.

According to a third aspect of the present invention there is provided a data-providing node. The data-providing node comprising a receiver for receiving the data key, an encryptor for encrypting the requested data using the data key, and a transmitter for sending the encrypted data to the data-processing entity.

The data-providing node may further comprise means for establishing a communication network session with the data-processing entity and a transmitter for sending the data using the communication network session.

According to a fourth aspect of the present invention there is provided a data-processing entity. The data-processing entity comprising a receiver for receiving the data key and the data-processing algorithm from the broker entity, a receiver for receiving the encrypted data from the data-providing node, a decryptor for decrypting the data using the data key, a processor for processing the data using the data-processing algorithm, and a transmitter for sending the processed data to the application node.

The data-processing entity may further comprise a receiver for receiving a message requesting its public key certificate and a transmitter for sending a message containing the public key certificate.

According to a fifth aspect of the present invention there is provided a method of establishing a communication network session between first and second client terminals using a subscription of an interlinking node. In the method, at the interlinking node, generating an access token and a session key and sending these to the first client terminal, the first client terminal using the access token and the session key for authenticating and registering with the communication network and, once the first client terminal is registered with the communication network, sending a session initiation message to the second client terminal over the communication network to initiate establishment of the session.

The session key may be a cryptographic function of the interlinking node's public key and a session identifier, and the access token may comprise at least the identity of the interlinking node and the session identifier signed with a private key of the interlinking node.

In a particular implementation, the step of authenticating and registering the first client terminal with the communication network comprises sending a register message containing the access token to the communication network, the communication network using the identity of the interlinking node contained within the access token to determine the public key of the interlinking node, using the session identifier contained within the access token and the public key of the interlinking node to calculate the session key, and using the session key as a shared secret to mutually authenticate the communication network and the first client terminal.

The communication network may be an IP Multimedia Subsystem.

According to a further aspect of the present invention there is provided a method of providing data from a sensor network to an application in an application environment, comprising arranging for a data-processing algorithm to be provided to a trusted data processor in the application environment, and for the data to be provided from the sensor network to the trusted data processor for processing by the trusted data processor using the data-processing algorithm, with the processed data being forwarded to the application. It may be that only the processed data is forwarded to the application. The data may be provided securely from the sensor network to the trusted data processor.

The data provided from the sensor network to the trusted data processor may bypass a broker entity arranged between the sensor network and the application for providing data services to the application. Further data-processing algorithms may be provided to the trusted data processor for processing existing data previously provided from the sensor network to the trusted data processor, this processed data being forwarding to the same or a different application.

An embodiment of the present invention provides at least one of the following advantages:
  Distributes the workload to increase scalability of the M2M system
  Protects the privacy of the information provided by the SNs
  That the Broker may control the traffic from the SNs to the Application
  That the SN Gateway may use the IMS network without an ISIM or an IMS subscription.

DETAILED DESCRIPTION

As mentioned above, with the rapid deployment of SNs and increased usage of M2M communication, the data processing workload of a Broker can be significant, especially when streaming data is sent from a SN. It is therefore desirable that the Broker can delegate some of its data processing tasks to Applications in order to maintain scalability of the system. Delegating tasks to Applications in order to reduce the workload on the Brokers requires that the SNs send data directly to those Applications. In addition, when the data being sent from a SN to an Application is in a streamed format and no further processing is required, it would be better if the gateway of the SN could transmit the data directly to the recipient Application.

When the data processing is done at the Broker level, the Broker may filter out sensitive information so that the Applications only receive that information which they are allowed to receive. By sending information directly from SNs to the Applications, the Applications may obtain additional information that they are not authorised to. Therefore, there is a need for a system that can delegate tasks whilst maintaining the desired level of security.

Figure 2:
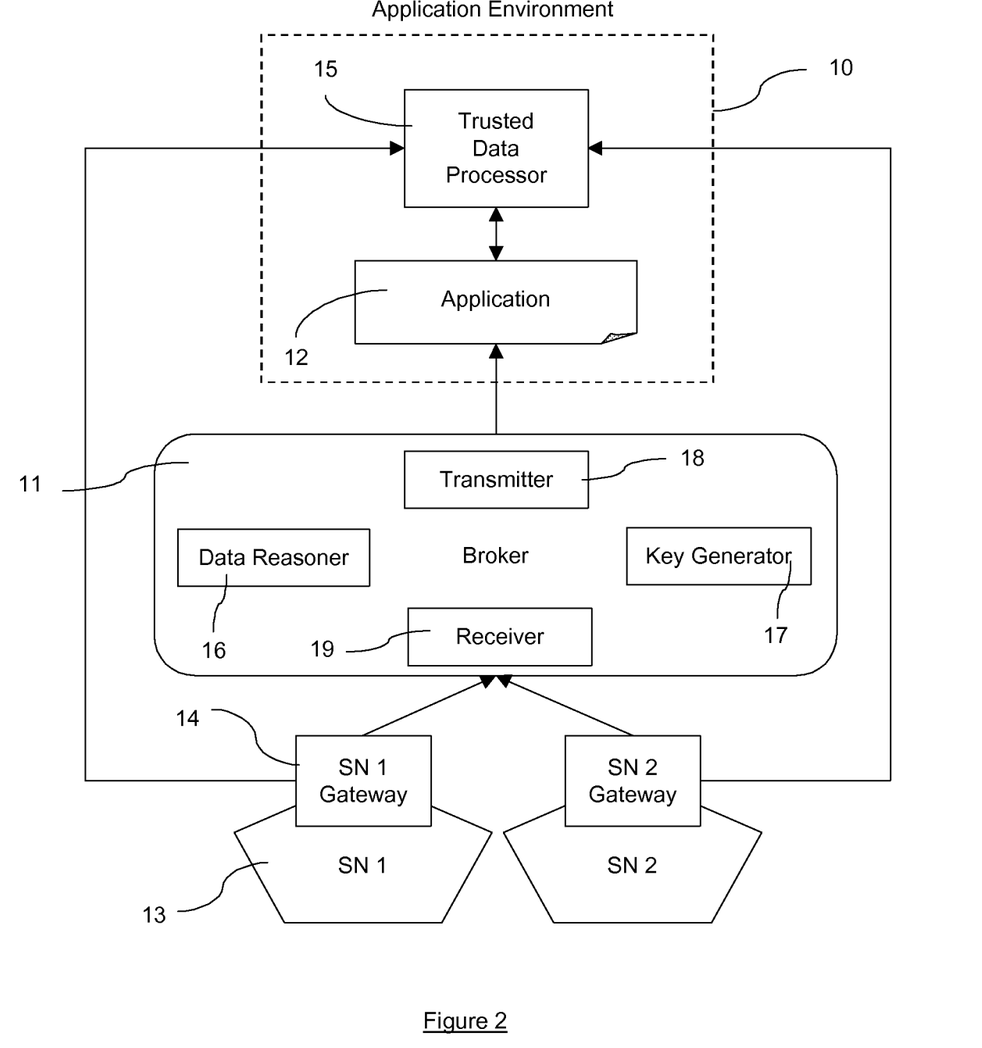
FIG. 2 illustrates schematically a M2M System according to an embodiment of the present invention.

FIG. 2 illustrates schematically an M2M system according to an embodiment of the present invention and comprises a Broker 11, an Application Environment 10, and one or more Sensor Networks (SN) 13. An Application Environment 10 is associated with one or several Applications 12 and is provided with at least one Trusted Data Processor (TDP) 15 to which a Broker 11 may delegate data processing tasks.

If a Broker 11 has delegated a data processing task to a TDP 15, then the SNs 13 can provide the data directly to that TDP 15, which processes the data and provides it to the Application 12. The data processing performed by the TDP 15 ensures that the Application 12 only receives information that it is authorised to receive.

To ensure that the TDP 15 can be trusted with the unprocessed data, the Broker 11 confirms that a trusted Certificate Authority (CA) has issued the TDP 15 with a public key certificate. The CA ensures that the TDP 15 conforms with its the compliance rules such that a TDP 15 with a valid public key certificate is trusted to receive the same level of sensitive information as the Broker 11. If a TDP 15 has been compromised then the CA can revoke its certificate.

The Broker 11 comprises Data Reasoner 16, a Key Generator 17, a Transmitter 18 and a Receiver 19. The Data Reasoner 16 analyses a request received from an Application 12 and decides from which SNs 13 the data is going to be collected and how the data is going to be processed. The Key Generator 17 generates keys to be used by the source SNs 13 to encrypt the data. The TDP 15 in the Application Environment 10 decrypts the data from the SNs 13, processes the data and provides the Application 12 with the processed results. The Application Environment 10 belongs to an M2M service provider and the M2M service provider can use the same TDP 15 for all its Applications.

Figure 3:
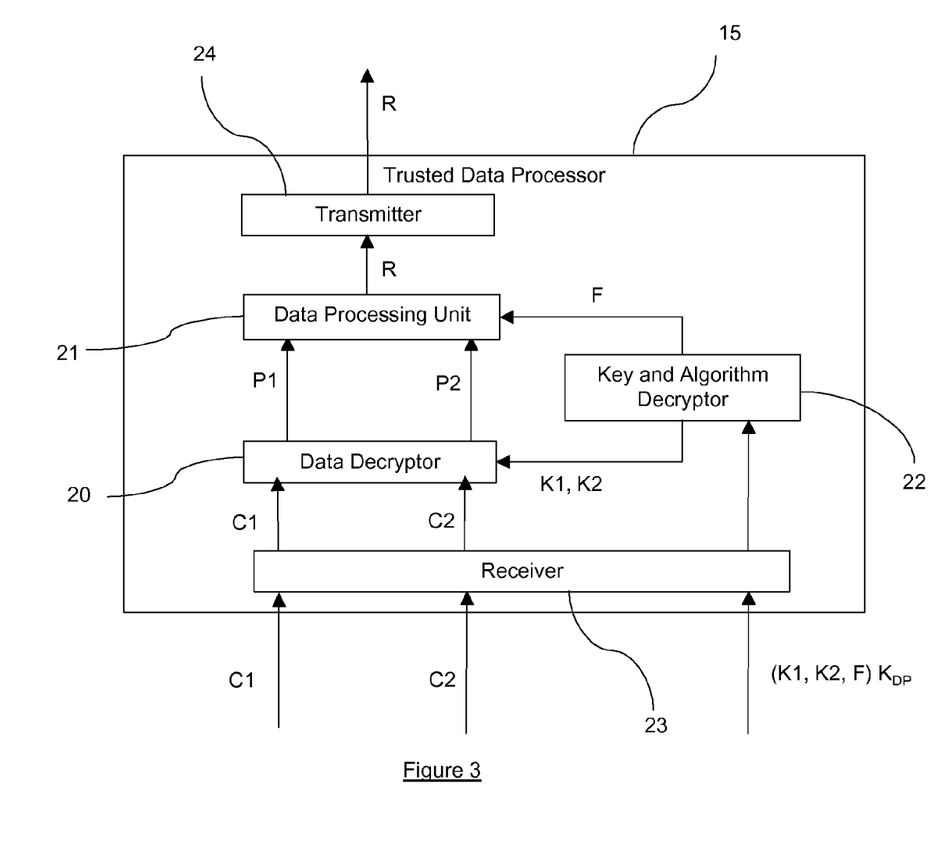
FIG. 3 illustrates schematically a Trusted Data Processor according to an embodiment of the present invention.

FIG. 3 schematically illustrates the TDP 15 of FIG. 2 in more detail. The TDP 15 comprises a Data Decryptor 20, a Data Processing Unit 21, a Key and Algorithm Decryptor 22, a Transmitter 24 and a Receiver 23. The algorithms and keys sent to the TDP 15, from Broker 11 via the Application 12, are encrypted so that the Applications cannot use them directly. The Key and Algorithm Decryptor 22 decrypts the algorithms and the keys. The Data Decryptor 20 then uses the keys $K_1$, $K_2$ provided by the Broker 11 to decrypt the data from SNs 13. The Data Processing Unit 21 uses the processing algorithm F to process the data and provides the results to the Application 12. The TDP 15 may also comprise a memory unit that could be used to cache the algorithm for re-use on further data, varying only any control parameters as required, or to cache the received data for processing using further algorithms.

It is assumed that the Broker 11 has security associations with the SNs 13 such that, when sensitive information (e.g. keys) is sent from the Broker 11 to SNs 13, the information is protected from eavesdropping and modifications. By way of example, these security associations could be established using the Internet Key Exchange (IKE) protocol as in the IPsec protocol suite.

Figure 4:
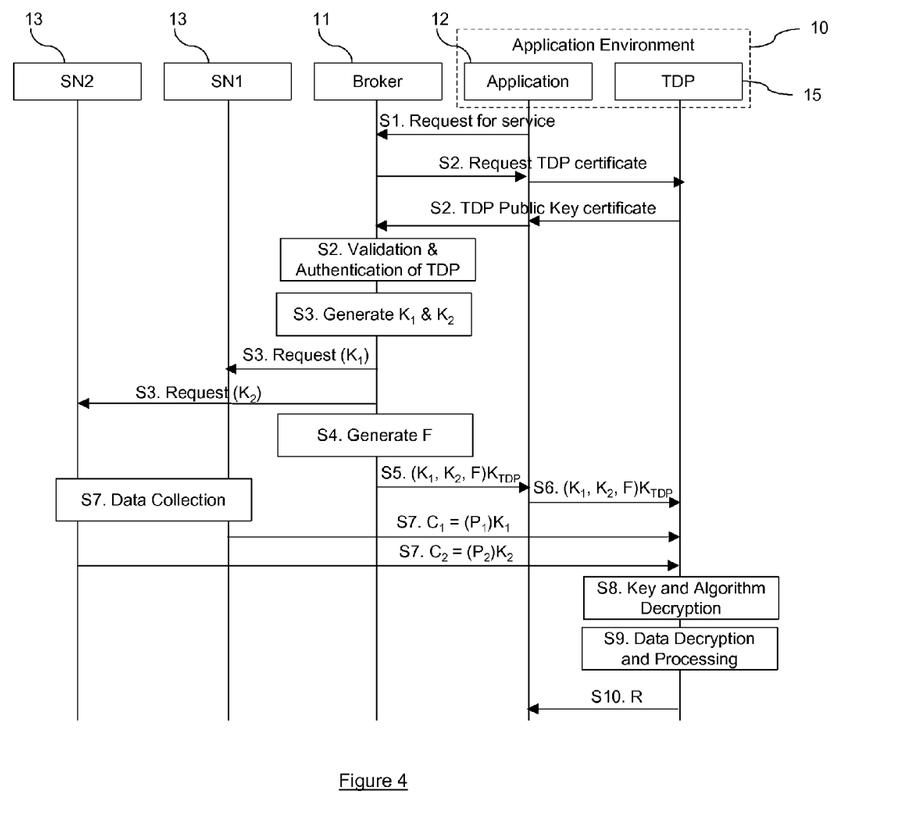
FIG. 4 illustrates an example signalling flow of a secure task delegation process according to an embodiment of the present invention.

The above concept will now be described in more detail with reference to FIG. 4, which shows a simplified signalling flow diagram in a situation where an Application 12 makes a request for service requiring data from two different SNs 13. The steps performed are as follows:

S1. The Application 12 sends a request to the Broker 11 asking for a service.

S2. The Broker 11 sends a request to the TDP 15, via the Application 12, to present its certificate and checks whether the certificate has expired or has been revoked. If the certificate is valid and the Broker 11 successfully authenticates the TDP 15 using the public key contained in the certificate, it continues with step S3. Otherwise the Broker 11 rejects the Application's request.

S3. The Data Reasoner 16 within the Broker 11 analyses the request from the Application 12 and decides from which SNs 13 the data is going to be collected. For each source SN 13, it instructs the Key Generator 17 to generate a data key K and sends it to the SN 13.

S4. The Data Reasoner 16 also produces a data processing algorithm F that identifies the source SNs 13 and provides the algorithm F that the TDP 15 will use to process the data from those SNs 13.

S5. The Broker 11 encrypts the data keys $K_1$, $K_2$ (generated by the Key Generator 17 at step S3) and the algorithm F (produced by the Data Reasoner 16 at step S4) with the TDP's public key $K_{TDP}$ and the result (i.e. ($K_1$, $K_2$, F) $K_{TDP}$) is sent to the Application 12.

S6. The Application 12 forwards the encrypted data keys $K_1$, $K_2$ and data processing algorithm F (i.e. ($K_1$, $K_2$, F) $K_{TDP}$) received at step S5 to the TDP 15.

S7. The SNs 13 collect data P. For each SN 13, when the data P is ready, the SN 13 encrypts P with the data key $K_1$ or $K_2$ received from the Broker 11 to produce encrypted data C (i.e. C=(P)K). The encrypted data C is sent to the TDP 15 in a communication session. The session can be established according to the procedures described below.

S8. The Key and Algorithm Decryptor 22 of the TDP 15 decrypts the data keys $K_1$, $K_2$ and the data processing algorithm F by using its private key. It sends the data keys $K_1$, $K_2$ and the algorithm F to the Data Decryptor 20 and the Data Processing Unit 21 respectively.

S9. The Data Decryptor 20 within the TDP 15 decrypts each input C by using the corresponding data key $K_1$ or $K_2$ and recovers the data P. The Data Processing Unit 21 within the TDP 15 processes the plaintext data (P1 and P2 as shown in FIG. 3) according to the algorithm F, generating a result (R).

S10. The TDP 15 outputs the result R to the Application 12.

The data processing acts so as to "filter out" sensitive information, either by removing it or by performing some irreversible modification to it such that the details of this information can no longer be ascertained, with only the processed result being sent to the Application 12. The unencrypted plaintext data (P1, P2) is never exposed outside of the TDP 15. Given that only the TDP 15 knows its private key, the Application 12 cannot decrypt the data keys provided by the Broker 11 and therefore cannot decrypt the unprocessed data such that the Applications only receive that information which they are allowed to receive As part of the process of delegating data processing tasks from the Broker 11 to the TDP 15, the Broker 11 redirects the data traffic from the SNs 13 directly to the TDP 15, bypassing the Broker 11. This may require that a communication session be established directly between the SNs 13 and the TDP 15 in the Application Environment 10. This communication can be done in several ways, such as using an Internet Protocol (IP)

or IP Multimedia Subsystem (IMS) connection. The following discussion refers to the use of an IP Multimedia Subsystem (IMS) as an example communication network, but it can also be applied to other networks.

IP Multimedia Subsystem (IMS) is the technology defined by the Third Generation Partnership Project (3G) to provide IP Multimedia services over mobile communication networks. IMS provides a dynamic combination of voice, video, messaging, data, etc. within the same session. The IMS makes use of the Session Initiation Protocol (SIP) to set up and control calls or sessions between user terminals (or user terminals and application servers). SIP makes it possible for a calling party to establish a packet switched session to a called party (using so-called SIP User Agents, UAs, installed in the user terminals) even though the calling party does not know the current IP address of the called party prior to initiating the call. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

If the communication between the SNs 13 and the TDP 15 was to take place over an IMS network this would require that either the SNs have an IMS subscription, or the Broker and the IMS provider are the same entity or that the SNs are able to make use of a third party's IMS subscription.

If the SNs 13 themselves do not have direct access or a subscription to an IMS network, and given that the Broker 11 redirects the data traffic from the SNs 13 directly to the TDP 15, it is reasonable that the Broker 11 is charged for the traffic. Therefore, a process for accessing a third party network is further presented here.

In order to establish an IMS session, the Broker 11 also provides the gateway 14 of each SN 13 with an indirect Access Token and a session key $K_{SESSION}$ when sending the request for data. In one embodiment, this session key can be computed as a cryptographic one-way function $f()$ of the session identifier session_ID and the public key $K_{M2Mbroker}$ of the Broker 11, i.e. $K=f(session\_ID, K_{M2Mbroker})$. In one embodiment, the Access Token consists of a signed set of critical information. For example, the token can include the SIP URI of the receiver, conditions to be met, the session identifier, the identity of the Broker 11 and the identity of the IMS Provider (IMSP), all signed using the private key $SK_{M2Mbroker}$ of the Broker 11, i.e. Access Token=(SIP URI of receiver, conditions, session_ID, Broker, IMSP)$_{sign}$ $SK_{M2Mbroker}$.

Figure 5:
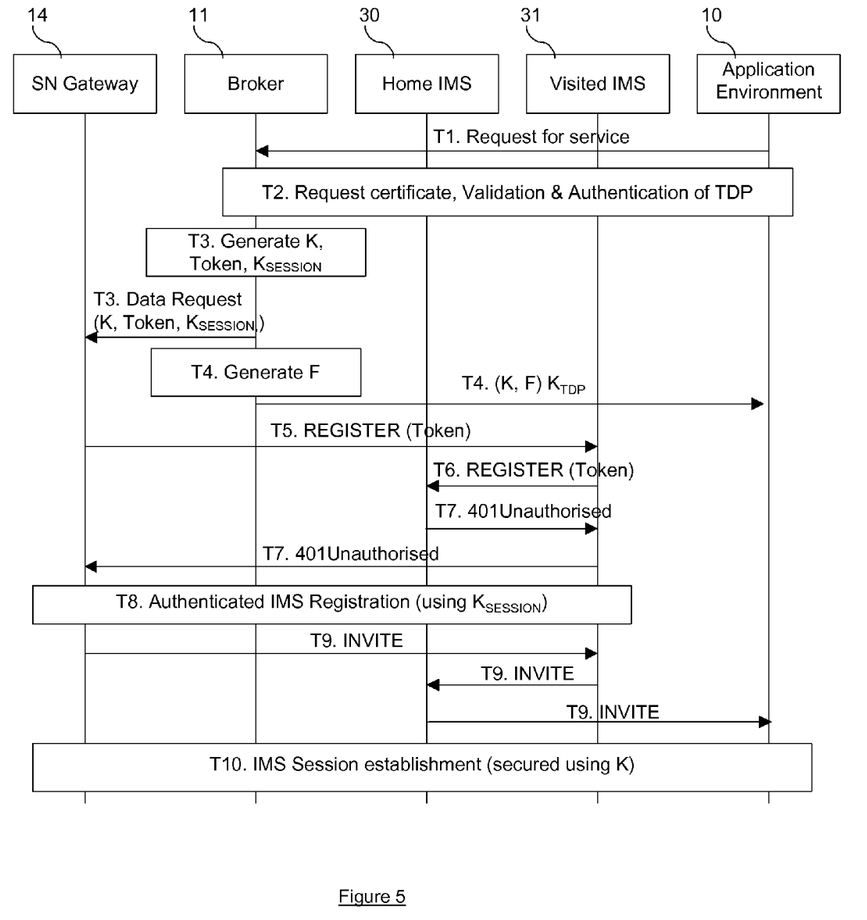
FIG. 5 illustrates an example signalling flow of an IMS Registration and session establishment for a secure task delegation process according to an embodiment of the present invention.

FIG. 5 shows a simplified signalling flow example in a situation where an Application 12 makes a request for service requiring data from an SN 13 wherein the SN 13 requires the establishment of an IMS Session using the Broker's 11 IMS subscription to communicate directly with the TDP 15 in the Application Environment 10. The steps performed are as follows:

T1. As with step S1 previously described with reference to FIG. 4, the Application 12 in the Application Environment 10 sends a request to the Broker 11 asking for a service.

T2. As with step S2 previously described with reference to FIG. 4, the Broker 11 sends a request to the TDP 15, via the Application 12, to present its certificate and checks whether the certificate has expired or has been revoked. If the certificate is valid and the Broker 11 successfully authenticates the TDP 15 using the public key contained in the certificate, it continues with step T3. Otherwise the Broker 11 rejects the Application's request.

T3. The Broker 11 generates a data key K, equivalent to that generated in step S3 previously described with reference to FIG. 4, for encrypting and decrypting the data. In addition, the Broker 11 also generates an Access Token and a session key $K_{SESSION}$. The Broker 11 sends the data key K, the Access Token and the session key $K_{SESSION}$ to the SN Gateway 14.

T4. As with steps S4 to S6 previously described with reference to FIG. 4, the Broker 11 also produces a data processing algorithm F, encrypts the data key K (generated at step T2) and the algorithm F with the public key $K_{TDP}$ of the TDP 15 and the result is sent to the TDP 15 in the Application Environment 10, via the Application 12.

T5. The SN Gateway 14 then sends a REGISTER message including the Access Token to the P-CSCF (not shown) in the Visited IMS 31.

T6. The P-CSCF identifies an I-CSCF (not shown) in the Home IMS 30 and forwards the REGISTER message. The I-CSCF in turn determines the S-CSCF (not shown) following reference to the HSS (not shown) and forwards the REGISTER message.

T7. The SN 13 is currently not authenticated, so the registration request is rejected and a 401 Unauthorised message is returned to the SN 13 with a challenge to authenticate the user.

T8. The SN 13 and IMS 30 are then mutually authenticated according to standard IMS AKA procedures, using the session key $K_{SESSION}$.

T9. Once the SN 13 is registered with the IMS 30 it sends an INVITE message to the SIP URI of the recipient TDP 15.

T10. An IMS Session is then established between the SN 13 and the TDP 15 in the Application Environment 10. Steps S7 to S10 previously described with reference to FIG. 4 can then take place directly between SN 13 and the TDP 15.

In order to implement the process described above, the CSCFs need to understand that the Access Token should be transported to the HSS, and the HSS is required to understand the token, maintain a list of Brokers and their public keys and shared symmetric keys, and to be able to check the conditions. Examples of the conditions could be the time of day, session duration session or results of other sensor measurements etc. This could for instance allow for independent control of when sessions should be initiated, for example, ensuring that a session does not have a privacy impact when related to a video stream from a home. The S-CSCF also needs to be able to enforce these conditions, preventing session initiation if the conditions are not met. The S-CSCF together with the HSS checks the conditions, the signature of the token and computes the key $K_{SESSION}$ using the session_ID and $K_{M2MBroker}$. $K_{SESSION}$ is then used as a shared secret between the SN and the IMS to perform mutual authentication using AKA without the need for an ISIM.

Once the SN Gateway 14 is authenticated and given a temporary SIP URI, it can initiate the allowed session(s) corresponding to the SIP URI of the receiver and the conditions.

As described above, the data sent from the SNs 13 to the TDP 15 is securely bootstrapped using the data keys K sent by the Broker 11 to both the TDP 15 and the SNs 13. The explicit method used for this is out of scope of the present invention but, for example, could be based on TLS using pre-shared keys.

When the SN 13 has a subscription to establish a communication channel with the TDP 15 or does not need subscription, the Broker 11 needs only to send the data key K to the SN 13 and the TDP 15. If a subscription is needed for the SN 13 to establish a communication channel and the SN 13 does not have one, the Broker 11 needs to send the Access Token and the session key $K_{session}$ along with the data key K to the SN 13.

The above-described embodiments provide for the delegation of data processing to reduce computational load on a Broker while maintaining the security of the data, as it may contain private data that should not be accessible by certain applications. For example, GPS data can provide location information to within a few meters. If an application only requires information regarding the current city of location for its service, it is not appropriate to expose the detailed GPS data to the application as this may violate privacy constraints. In another example, an insurance company may require an individual's health index calculated using various parameters such as the individuals ECG measurements, blood pressure etc. Providing the detailed data of such parameters could also violate some privacy policy.

It will be appreciated by the person of skill in the art that various modifications may be made to the above-described embodiments without departing from the scope of the present invention.

The invention claimed is:

1. A method of at least partly delegating processing of data for use in a machine-to-machine system to reduce computational load on a broker entity while maintaining security of the data to be processed, the broker entity serving as a link between a node of a sensor network providing the data and an application node requesting the data, and the method comprising:
   at the broker entity, responsive to receiving a request from the application node for processed data, determining a data-providing node as the node of the sensor network that provides the data to be processed, generating a data key for the data-providing node, generating a data-processing algorithm for processing the data in dependence upon the request, sending the data key to the data-providing node, and sending the data key and data-processing algorithm to a remote data-processing entity;
   at the data-providing node, encrypting the data using the data key and sending the encrypted data to the remote data-processing entity; and
   at the remote data-processing entity, decrypting the encrypted data using the data key, processing the decrypted data using the data-processing algorithm, and sending the processed data to the application node.

2. The method of claim 1, further comprising authenticating the data-processing entity by:
   sending a message from the broker entity to the remote data-processing entity requesting the remote data-processing entity's public key certificate;
   sending a message from the remote data-processing entity to the broker entity containing the remote data-processing entity's public key certificate; and
   at the broker entity, confirming whether or not the certificate is valid.

3. The method of claim 1, wherein sending the data key and data-processing algorithm to the remote data-processing entity comprises:
   at the broker entity, encrypting the data key and data-processing algorithm using a public key of the remote data-processing entity;
   sending the encrypted data key and data-processing algorithm to the remote data-processing entity; and
   at the remote data-processing entity, decrypting the data key and data-processing algorithm using a private key of the remote data-processing entity.

4. The method of claim 1, wherein the data-processing algorithm is arranged to filter out at least some information from the data the algorithm is used to process.

5. The method of claim 1, wherein said sending the processed data to the application node comprises sending only the processed data to the application node, thereby hiding any unprocessed data from the application node.

6. The method of claim 1, wherein said sending the data key and data-processing algorithm to the remote data-processing entity comprises sending the data key and data-processing algorithm to the remote data-processing entity via the application node.

7. The method of claim 1, wherein said sending the encrypted data to the remote data-processing entity comprises bypassing the broker entity.

8. The method of claim 1, wherein the data-providing node comprises a plurality of nodes.

9. The method of claim 1, further comprising sending a further data-processing algorithm to the remote data-processing entity, and using this further data-processing algorithm at the remote data-processing entity to process already-received data.

10. The method of claim 9, further comprising, at the remote data-processing entity, sending the data processed using the further data-processing algorithm to a further application node associated with the further data-processing algorithm.

11. The method of claim 1, wherein said sending the encrypted data to the remote data-processing entity comprises:
    establishing a communication network session between the data-providing node and the remote data-processing entity; and
    sending the encrypted data using the communication network session.

12. The method of claim 11, wherein said establishing the communication network session comprises:
    at the broker entity, generating and sending an access token and a session key to the data-providing node;
    authenticating and registering the data-providing node with the communication network using the access token and the session key; and
    once the data-providing node is registered with the communication network, sending a session initiation message to the remote data-processing entity.

13. The method of claim 12, wherein the session key is a cryptographic function of the broker entity's public key and a session identifier, and the access token comprises at least the identity of the broker entity and the session identifier signed with a private key of the broker entity.

14. The method of claim 13, wherein said authenticating and registering the data-providing node with the communication network comprises:
    sending a register message containing the access token to the communication network, the communication network using the identity of the broker entity contained within the access token to determine the public key of the broker entity;
    using the session identifier contained within the access token and the public key of the broker entity to calculate the session key; and
    using the session key as a shared secret to mutually authenticate the communication network and the data-providing node.

15. The method of claim 11, wherein the communication network is an IP Multimedia Subsystem.

16. The method of claim 1, wherein the data-processing entity is provided in an application environment associated with the application node.

17. A broker entity configured to at least partly delegate processing of data in a machine-to-machine system to reduce computational load on the broker entity while maintaining security of the data to be processed, the broker entity serving as a link between a node of a sensor network providing the data and an application node requesting the data, and the broker entity comprising:
- a receiver configured to receive a request for processed data from the application node;
- a data reasoner configured to determine a data-providing node as the node of the sensor network that provides the data to be processed, and to generate a data-processing algorithm to process the data in dependence upon the request;
- a key generator configured to generate a data key for the data-providing node;
- a transmitter configured to send the data key to the data-providing node, and to send the data key and data-processing algorithm to a remote data-processing entity.

18. The broker entity of claim 17, wherein the transmitter is further configured to send a message to the remote data-processing entity requesting the remote data-processing entity's public key certificate, wherein the receiver is further configured to receive a message containing the remote data-processing entity's public key certificate, and wherein the broker entity further comprises a processor configured to confirm whether or not the certificate is valid and to correspondingly authenticate the remote data-processing entity.

19. A data-processing entity configured to assist with at least partial delegation of data processing in a machine-to-machine system, to thereby reduce the computational load on a broker entity while maintaining security of the data to be processed, the broker entity serving as a link between a node of a sensor network providing the data and an application node requesting the data, and the data-processing entity comprising:
- a receiver configured to receive a data key and a data-processing algorithm from the broker entity, and to receive encrypted data from a data-providing node;
- a decryptor configured to decrypt the encrypted data using the data key;
- a processor configured to process the decrypted data using the data-processing algorithm; and
- a transmitter configured to send the processed data to the application node.

20. The data-processing entity of claim 19, wherein the receiver is further configured to receive a message requesting a public key certificate of the data-processing entity, and wherein the transmitter is further configured to send a message containing the public key certificate.

* * * * *